(12) United States Patent
Cao et al.

(10) Patent No.: US 10,733,019 B2
(45) Date of Patent: Aug. 4, 2020

(54) APPARATUS AND METHOD FOR DATA PROCESSING

(71) Applicant: EMC IP HOLDING COMPANY LLC, Hopkinton, MA (US)

(72) Inventors: Yu Cao, Beijing (CN); Zhe Dong, Beijing (CN); Xiaoyan Guo, Beijing (CN); Jun Tao, Shanghai (CN); Sanping Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 79 days.

(21) Appl. No.: 15/384,432

(22) Filed: Dec. 20, 2016

(65) Prior Publication Data

US 2017/0185452 A1    Jun. 29, 2017

(30) Foreign Application Priority Data

Dec. 29, 2015 (CN) .......................... 2015 1 1017541

(51) Int. Cl.
*G06F 9/50* (2006.01)
*G06F 9/48* (2006.01)
*G06F 16/182* (2019.01)

(52) U.S. Cl.
CPC .............. *G06F 9/5005* (2013.01); *G06F 9/48* (2013.01); *G06F 9/4806* (2013.01); *G06F 9/4843* (2013.01); *G06F 9/4881* (2013.01); *G06F 9/50* (2013.01); *G06F 9/505* (2013.01); *G06F 9/5011* (2013.01); *G06F 9/5022* (2013.01);
(Continued)

(58) Field of Classification Search
CPC ........ G06F 9/48; G06F 9/4806; G06F 9/4843; G06F 9/4881; G06F 9/50; G06F 9/5005; G06F 9/5011; G06F 9/5022; G06F 9/5027; G06F 9/5033; G06F 9/5038; G06F 9/5044; G06F 9/5061; G06F 9/5072

See application file for complete search history.

(56) References Cited

U.S. PATENT DOCUMENTS 7,872,769 B2 * 1/2011 Akashi ................... G06F 3/1213
358/1.14
9,250,953 B2 * 2/2016 Kipp ......................... G06F 9/46
(Continued)

FOREIGN PATENT DOCUMENTS

CN          103067524 A      4/2013
CN          103699425 A      4/2014

OTHER PUBLICATIONS

Notification of First Chinese Office Action issued in counterpart Application Serial No. 2015110175416 dated Mar. 16, 2020.

*Primary Examiner* — Charles M Swift
(74) *Attorney, Agent, or Firm* — Brian J. Colandreo; Mark H. Whittenberger; Holland & Knight LLP

(57) ABSTRACT

Embodiments of the present disclosure provide a method and apparatus for data processing. The apparatus comprises: a dividing unit configured to divide, based on a predetermined policy, computation workload for data in a storage node into at least one sub-workload; and a dispatching unit configured to dispatch the at least one sub-workload to at least one of the storage node and a computing node that is physically separate from the storage node for execution of the at least one sub-workload with computing resources in the at least one of the storage node and the computing node.

20 Claims, 10 Drawing Sheets

(52) U.S. Cl.
CPC .......... *G06F 9/5027* (2013.01); *G06F 9/5033* (2013.01); *G06F 9/5038* (2013.01); *G06F 9/5044* (2013.01); *G06F 9/5061* (2013.01); *G06F 9/5066* (2013.01); *G06F 9/5072* (2013.01); *G06F 9/5083* (2013.01); *G06F 9/5088* (2013.01); *G06F 16/182* (2019.01); *G06F 2209/501* (2013.01)

(56) References Cited

U.S. PATENT DOCUMENTS

| | | | | |
|---|---|---|---|---|
| 2007/0094270 A1* | 4/2007 | Gallino | ................ | G06F 9/50 |
| 2008/0222632 A1* | 9/2008 | Ueno | ................ | G06F 11/3423 |
| | | | | 718/1 |
| 2011/0055843 A1* | 3/2011 | Keeton | ................ | G06F 9/4881 |
| | | | | 718/104 |
| 2012/0159506 A1* | 6/2012 | Barham | ................ | G06F 9/5044 |
| | | | | 718/104 |
| 2012/0198462 A1* | 8/2012 | Cham | ................ | G06F 9/5038 |
| | | | | 718/103 |
| 2013/0346993 A1* | 12/2013 | Chen | ................ | G06F 9/4881 |
| | | | | 718/103 |
| 2015/0052530 A1* | 2/2015 | Jacobson | ................ | G06F 9/5066 |
| | | | | 718/102 |
| 2015/0113145 A1* | 4/2015 | Walls | ................ | H04L 41/12 |
| | | | | 709/226 |
| 2015/0326467 A1* | 11/2015 | Fullbright | ................ | H04L 45/04 |
| | | | | 709/242 |
| 2015/0363229 A1* | 12/2015 | Wang | ................ | G06F 9/4881 |
| | | | | 718/103 |
| 2016/0062795 A1* | 3/2016 | Hu | ................ | H04L 47/783 |
| | | | | 718/104 |
| 2016/0164774 A1* | 6/2016 | Besaw | ................ | H04L 45/04 |
| | | | | 709/239 |
| 2016/0246528 A1* | 8/2016 | Colgrove | ................ | G06F 3/0622 |
| 2016/0378570 A1* | 12/2016 | Ljubuncic | ................ | G06F 9/5027 |
| | | | | 718/104 |

* cited by examiner

APPARATUS AND METHOD FOR DATA PROCESSING

RELATED APPLICATIONS

This application claim priority from Chinese Patent Application Number CN201511017541.6, filed on Dec. 29, 2015 at the State Intellectual Property Office, China, titled "APPARATUS AND METHOD FOR DATA PROCESSING," the contents of which is herein incorporated by reference in its entirety

FIELD

Embodiments of the present disclosure relate to data processing, and more particularly, to an apparatus and method for data processing in, for example, big data analytics.

BACKGROUND

In big data analytics, since the amount of to-be-processed data is enormous, for example, attaining PB (Petabyte), EB (Exabyte) or ZB (Zettabyte) levels, to avoid huge data traffic, i.e. "move compute closer to data" becomes an important rule of optimization in big data analytics.

Traditional big data analytics systems take system configurations in the node cluster form. FIG. 1 shows a system configuration of a traditional system for big data analytics. The system configuration takes the form of a cluster 100 comprising a plurality of nodes 110-1, 110-2, 110-3 and 110-4 (collectively called node 110). Each node 110 in cluster 100 may be implemented as one physical or virtual server, and the big data analytics system stores data with commodity data storage (e.g., a hard disk) built in servers. Hence, each server (i.e. node 110) in cluster 100 not only acts as a computing node C but also a storage node S (wherein a set of the computing nodes C constitute a computing layer 120, while a set of the storage nodes S constitute a storage layer 130). Thereby, the system configuration shown in FIG. 1 makes full use of the rule of optimization as "move computing closer to data".

In particular, the system configuration allows the big data analytics system to optimize the data placement and computing task scheduling strategies so as to maximize the chances that computing tasks will be conducted at the local node where the corresponding computing data is located (i.e. data co-locality), i.e. moving computing tasks closer to corresponding computing data as far as possible, and thereby minimizing the data transmitted over the network.

As the application deployment evolves, especially in the enterprise-grade application deployment, the commodity data storage built in servers in more and more big data analytics systems is substituted for enterprise-grade external storage systems (e.g. EMC Isilon) with enhanced performance and enriched data services (e.g. snapshots, backup, deduplication, access control, etc.). However, the computing layer and the storage layer in enterprise-grade external storage systems are discrete, so the above-mentioned rule of optimization "move compute closer to data" is no longer straightforwardly applicable to such big data analytics systems.

SUMMARY

Therefore, to solve the problems in one or more prior arts, there is a need for a technical solution that divides a computation workload before dispatching so that it is made possible for computing resources in a storage node to participate in executing resultant computation workloads.

In a first aspect, there is provided an apparatus for data processing. The apparatus comprises: a dividing unit configured to divide, based on a predetermined policy, computation workload for data in a storage node into one or more sub-workloads; and a dispatching unit configured to dispatch the one or more sub-workloads to at least one of the storage node and a computing node that is physically separate from the storage node for execution of the one or more sub-workloads with computing resources in the at least one of the storage node and the computing node.

In some embodiments, the predetermined policy indicates at least one of the following: dividing the computation workload based on computing capability of the computing node and computing capability of the storage node; and dividing the computation workload based on a type of the computation workload.

In some embodiment, the one or more sub-workloads at least include a first sub-workload.

In some embodiments, the dividing unit is configured to divide all of the computation workload into the first sub-workload if the predetermined policy indicates dividing the computation workload based on the respective computing capabilities of the computing node and the storage node; and the dispatching unit is further configured to dispatch the first sub-workload to the storage node in response to determining the computing capability of the storage node is sufficient to execute the first sub-workload.

In some embodiments, the dividing unit is configured to divide a part of the computation workload into the first sub-workload if the predetermined policy indicates dividing the computation workload based on the computing capability of the computing node and the computing capability of the storage node; and the dispatching unit is further configured to dispatch the first sub-workload to the storage node in response to determining the computing capability of the storage node is sufficient to execute the first sub-workload.

In some embodiments, the one or more sub-workloads further includes a second sub-workload that is different from the first sub-workload, the second sub-workload includes part of the computation workload; and wherein the dispatching unit is further configured to dispatch the second sub-workload to the computing node.

In some embodiments, the dividing unit is configured to divide the computation workload into an input/output (I/O)-intensive sub-workload if the predetermined policy indicates dividing the computation workload based on the computing capability of the computing node and the computing capability of the storage node and dividing the computation workload based on the type of the computation workload; and the dispatching unit is configured to dispatch the I/O-intensive sub-workload to the storage node.

In some embodiments, if the predetermined policy indicates dividing the computation workload based on the type of the computation workload, the first sub-workload includes an I/O-intensive sub-workload; and the second sub-workload includes a computing-intensive sub-workload.

In some embodiments, there is dependency between the first sub-workload and the second sub-workload, and the apparatus further comprises: a control unit configured to control data exchange between the computing node and the storage node based on the dependency.

In some embodiments, the control unit is further configured to schedule execution of the first sub-workload and the second sub-workload based on the dependency.

In a second aspect, there is provided a method for data processing. The method comprises: dividing, based on a predetermined policy, computation workload for data in a storage node into one or more sub-workloads; and dispatching the one or more sub-workloads to at least one of the storage node and a computing node that is physically separate from the storage node for execution of the one or more sub-workloads with computing resources in the at least one of the storage node and the computing node.

In a third aspect, there is provided a server. The server comprises: at least one processing unit; and a memory coupled to the at least one processing unit and storing instructions thereon, the instructions, when executed by the at least one processing unit, performing the method according to the embodiments of the present disclosure.

In a fourth aspect, there is provided a computer program product. The computer program product is tangibly stored on a non-transient machine-readable medium and comprises machine-executable instructions, the instructions, when executed on a device, causing the device to execute the method according to the embodiments of the present disclosure.

According to the embodiments of the present disclosure, by analyzing a computation workload before dispatching so as to divide the computation workload, it makes it possible for computing resources in a storage node to participate in execution of resultant computation workloads, thereby improving the data computation performance.

BRIEF DESCRIPTION OF THE DRAWINGS

Through the detailed description of some embodiments of the present disclosure in the accompanying drawings, the features, advantages and other aspects of the present disclosure will become more apparent, wherein several embodiments of the present disclosure are shown for the illustration purpose only, rather than for limiting. In the accompanying drawings.

DETAILED DESCRIPTION

Principles of the present disclosure are described below by means of several exemplary embodiments as shown in the accompanying drawings. It should be understood that these embodiments are described only for enabling those skilled in the art to better understand and further implement the present disclosure, rather for limiting the scope of the present disclosure in any manner.

As described above, the rule of optimization "move compute closer to data" is no longer straightforwardly applicable to big data analytics systems using enterprise-grade external storage systems, mainly due to the following obstacles (1)-(3).

(1) Computing Layer does not Know the Exact Data Location Information.

Figure 1:
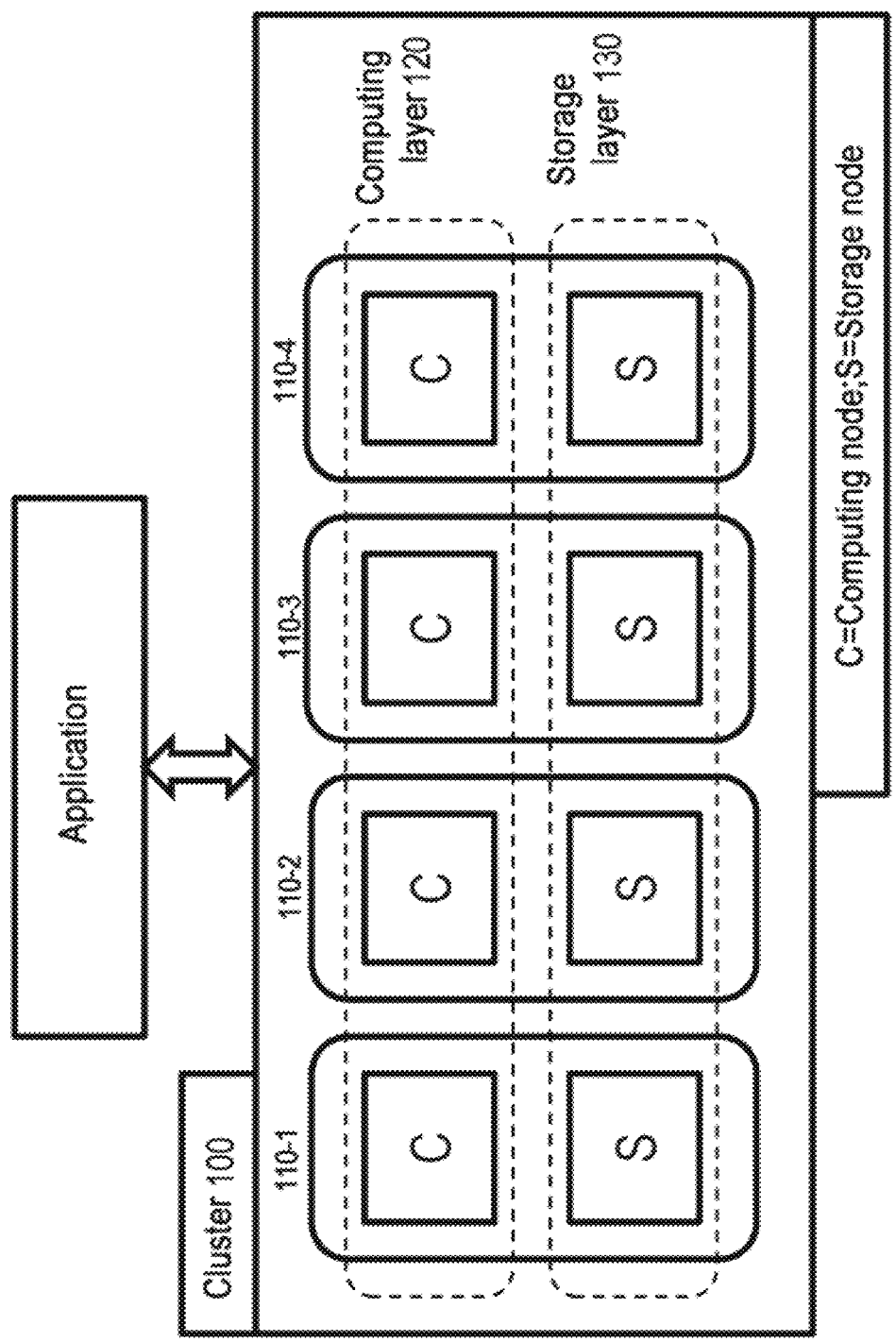
FIG. 1 shows a system configuration of a traditional system for big data analytics.

As shown in FIG. 1, traditional big data analytics systems directly manage the commodity data storage (e.g. the Distributed File System in Hadoop (HDFS) is managed by the NameNode), and thus know the exact location information of compute data within the cluster, which would be leveraged for maximizing the data co-locality of computing tasks and corresponding compute data. In contrast, when the data storage services are provided by external storage systems via a standard protocol (like HDFS), the data location information becomes transparent to the computing layer. As a result, it becomes hard, if not totally infeasible, for the computing layer to effectively schedule computing tasks according to the data locations in order to maximize the data co-locality.

(2) Storage Layer does not Understand the Computation Workloads.

Nowadays, the storage layer constituted by external storage systems has little knowledge about detailed characteristics (e.g. access patterns) of the upper computation workloads. As such, the external storage system can hardly conduct workload-aware data placement optimizations. For example, a scale-out Network Attached Storage (NAS) system like EMC Isilon contains multiple data nodes which can be independently contacted by upper data access requests. The data to be retrieved by a data access request might be stored at a remote data node that is different from the data node to which the request is sent. This will incur data transmission over a network. There are no obvious ways for the NAS system to effectively predict which data the incoming data access requests will look for and which data nodes the requests will connect to, and then adjust data placements accordingly to avoid remote data fetching.

(3) Storage Layer's Computing Capabilities are not Effectively Utilized

Besides storage capability, the storage layer constituted by external storage systems further has computing capability. At present, however, the computing capability is only used to support the running of operating systems of storage systems, but not provided to users. Therefore, at most of time the computing capability is idle, which is inefficient to network systems.

In view of the foregoing problems in the prior art, there is a need for a technical solution for achieving the rule of optimization "move compute closer to data" in the architecture where the computing layer is separate from the storage layer.

Current enterprise-grade external storage systems often have powerful computing capability that are way more than enough for serving storage control and data services. In this case, the central processing unit (CPU) and random access memory (RAM) utilization rates of the storage hypervisors are usually at a low level (e.g. <10%). Recently, more and more storage vendors begin to equip their storage systems (e.g. EMC VMAX3) with the ability to dynamically allocate processor cores to allow user-space applications to run inside the storage system instead of on a server separate from the storage system. Such computing services are exposed by the storage system to users via application programming interfaces (APIs) and/or Service catalogs.

In view of the foregoing characteristics of current enterprise-grade external storage systems, embodiments of the present disclosure propose a technical solution that makes it possible for computing resources in the storage system to participate in the execution of computation workloads, using computing capability exposed by the storage system.

Figure 2:
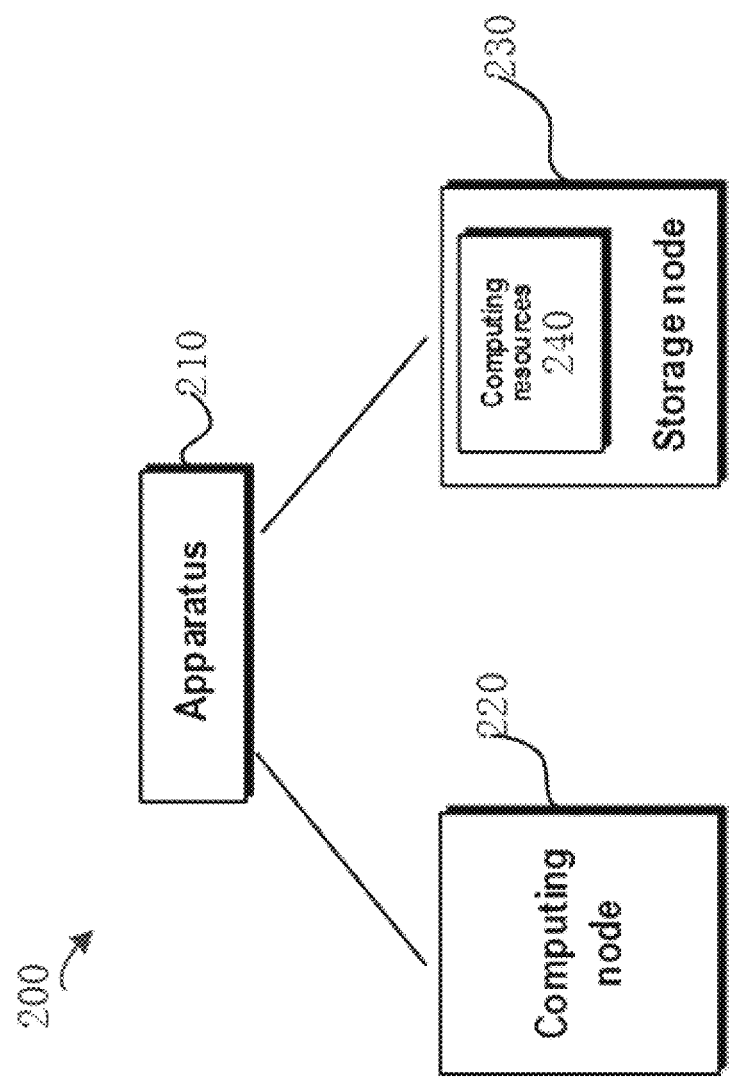
FIG. 2 shows a block diagram of an exemplary environment in which the embodiments of the present disclosure may be implemented.

FIG. 2 shows a block diagram of an exemplary environment 200 in which the embodiments of the present disclosure may implemented. As shown in FIG. 2, environment 200 comprises an apparatus 210 for data processing according to an embodiment of the present disclosure, a computing node 220 and a storage node 230.

Computing node 220 is configured to provide computing services to users by means of its own computing resources (e.g. CPU and memory). Computing node 220 may be implemented as a physical or virtual server, for example.

Storage node 230 is configured to reside outside computing node 220, i.e., storage node 230 is physically separate from computing node 220. Storage node 230 may communicate with computing node 220 through a network, for example.

Besides storage resources (not shown) for providing storage services to users, storage node 230 further include computing resources 240, such as CPU and memory for providing data services to users (e.g. snapshots, back-up, deduplication and access control).

It should be understood although FIG. 2 shows only one computing node 220, computing node 220 may represent either an integrated computing system or a distributed computing system (a cluster computing system composed of multiple computing nodes 220). Likewise, although FIG. 2 shows only one storage node 230, storage node 230 may represent either an integrated storage system or a distributed storage system (a cluster storage system composed of multiple storage nodes 230). The scope of the embodiments of the present disclosure is not limited in this regard.

Apparatus 210 for data processing may be implemented in a computing node outside computing node 220. Alternatively, apparatus 210 may also be implemented in computing node 220. The scope of the embodiments of the present disclosure is not limited in this regard.

Currently, a computation workload, from a user application, for data in storage node 230 is entirely dispatched to computing node 220. In response to receiving the computation workload, computing node 220 communicates with storage node 230 to obtain data to be processed. In other words, the data to be processed has to move from storage node 230 to computing node 220. When the amount of the data to be processed is enormous, for example, attaining PB (Petabyte), EB (Exabyte) or ZB (Zettabyte) levels, the data movement becomes a main computation bottleneck for computing node 220.

To at least partially solve the bottleneck problem, the embodiments of the present disclosure provide apparatus 210 for data processing for the purpose of improving the data processing performance of environment 200.

According to the embodiments of the present disclosure, apparatus 210 divides, based on a predetermined policy, computation workload into one or more sub-workloads, and then dispatches the one or more sub-workloads to at least one of the storage node 230 and the computing node 220 for execution of the one or more sub-workloads with computing resources in the at least one of the storage node 230 and the computing node 220.

With reference to FIGS. 3 to 8 and by means of exemplary environment 200 as shown in FIG. 2, detailed description is presented below to an apparatus for data processing according to the embodiments of the present disclosure.

Figure 3:
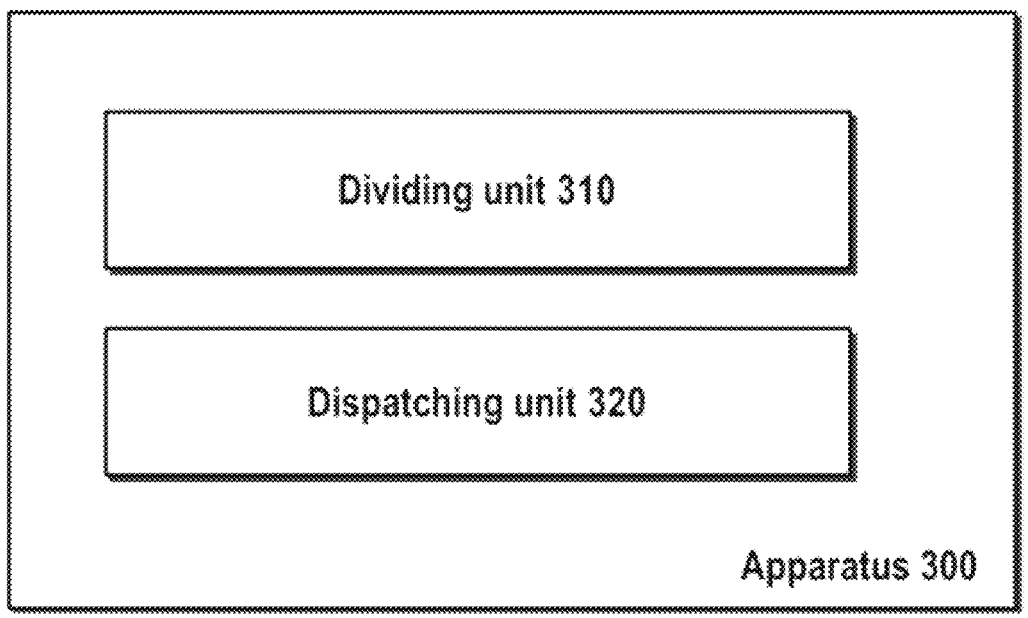
FIG. 3 shows a block diagram of an apparatus for data processing according to an embodiment of the present disclosure.

FIG. 3 shows an apparatus 300 for data processing according to an embodiment of the present disclosure. Apparatus 300 may be used as one implementation of apparatus 210 shown in FIG. 2.

As shown in FIG. 3, apparatus 300 comprises a dividing unit 310 and a dispatching unit 320. For example, apparatus 300 may receive a computation workload for data in storage node 230 from the user's application. Dividing unit 310 is configured to divide the received workload into one or more sub-workloads based on a predetermined policy. Dispatching unit 320 is configured to dispatch the one or more sub-workloads to at least one of the storage node 230 and the computing node 220 that is physically separate from the storage node 230 for execution of the one or more sub-workloads with computing resources in the at least one of the storage node 230 and the computing node 220.

According to the embodiments of the present disclosure, by analyzing and dividing the computation workload before dispatching, it is made possible for storage node 230 to participate in the execution of the divided computation workload. Therefore, only if computing capability of storage node 230 is not sufficient to execute all or part of the computation workload, computing node 220 independently completes the execution of the computation workload, thereby improving the data computation performance.

According to the embodiments of the present disclosure, computing node 220 is the core for providing compute services to users and is thus equipped with abundant computing resources. Accordingly, computing node 220 has more powerful computing capability over storage node 230. In this regard, the predetermined policy may comprise dividing the computation workload based on computing capability of computing node 220 and storage node 230.

In some embodiments, the one or more sub-workloads at least include a first sub-workload.

In some embodiments, if the predetermined policy indicates dividing the computation workload based on the computing capability, the first sub-workload includes all of the computation workload, and dispatching unit 320 is further configured to dispatch the first sub-workload to storage node 230 in response to determining the computing capability of storage node 230 is sufficient to execute the first sub-workload. In other words, in these embodiments, the computation workload is entirely dispatched to storage node 230. As a result, the data to be processed simply moves from a storage device in storage node 230, which completely avoids the data transmission to computing node 220 via a network and saves time for data processing.

As described above, storage node 230 may leverage computing resources 240 to provide users with data services, e.g. snapshots, backup, deduplication and access control. Therefore, in this disclosure, by "the storage node's computing capability is sufficient to execute the workload", it is meant after removing computing resources used for providing data services from the storage node's computing resources, remaining computing resources is sufficient to execute the workload.

For example, it can be determined whether the computing capability of storage node 230 is sufficient to execute all or part of the computation workload in the following manner. The amount of required computing resources (e.g. the number of CPU life cycles) for executing all or part of the computation workload may be estimated, and then it is determined whether, after removing computing resources used for providing data services from computing resources 240 of storage node 230, the amount of remaining computing resources (e.g. the number of CPU life cycles) is greater than the amount of required computing resources or not. If yes, it may be determined the computing capability of storage node 230 is sufficient to execute all or part of the computation workload. It should be understood that any other appropriate means may be used to determine whether the computing capability of storage node 230 is sufficient to execute all or part of the computation workload. The scope of the present disclosure is not limited in this regard.

In some embodiments, if the predetermined policy indicates dividing the computation workload based on the computing capability, the first sub-workload includes all of the computation workload and dispatching unit 320 is further configured to: in response to determining the computing capability of storage node 230 is insufficient to execute the first sub-workload, dispatch the first sub-workload to computing node 220. For example, after computing resources used for providing data services are removed from computing resources 240 of storage node 230, if the amount of remaining computing resources is less than the amount of required computing resources for executing the first sub-workload, then dispatching the first sub-workload to storage node 230 will harm storage node 230 in providing normal data services. In this case, the first sub-workload (i.e. all of the computation workload) is dispatched to computing node 220.

In some embodiments, if the predetermined policy indicates dividing the computation workload based on the computing capability, the first sub-workload includes part of the computation workload and dispatching unit 320 is further configured to dispatch the first sub-workload to storage node 230 in response to determining the computing capability of storage node 230 is sufficient to execute the first sub-workload.

Considering that computing resources 240 in storage node 230 is much closer to data stored in storage node 230 than computing node 220, storage node 230 is more suitable for input/output I/O-intensive sub-workloads with lightweight processing logic. Alternatively or additionally, the predetermined policy may indicate dividing the computation workload based on a type of the computation workload. In this case, sub-workloads dispatched to storage node 230 may comprise I/O-intensive sub-workloads. Examples of the I/O-intensive sub-workloads may include, but not limited to, data selection, data filtering, data projection and the like.

It should be understood that the policy for dividing a computation workload based on computing capability of the computing node and computing capability of the storage node and the policy for dividing the computation workload based on the type of the computation workload are merely examples of the predetermined policies according to the present disclosure, and they may be used separately, jointly, or in combination with other policy. The scope of the embodiments of the present disclosure is not limited in this regard.

In some embodiments, the one or more sub-workloads further includes a second sub-workload different from the first sub-workload. The second sub-workload includes part of the computation workload and dispatching unit 320 is further configured to dispatch the second sub-workload to computing node 220.

As described above, since computing node 220 is the core of providing compute services to users and thus equipped with abundant computing resources. Therefore, computing node 220 is more suitable for computation-intensive workloads. In this case, sub-workloads dispatched to computing node 220 may include computation-intensive sub-workloads. Examples of the computation-intensive sub-workloads may include, but not limited to, data sort, data aggregation, etc.

As one example, whether a given workload is an I/O-intensive workload or a computation-intensive workload can be determined in the following manner. The number of required I/O operations and the number of required CPU lifecycles used for executing the workload may be estimated. Then, the ratio of the number of required CPU lifecycles to the number of required I/O operations may be calculated. If the ratio is greater than a predetermined threshold (e.g. 100), then it may be considered the workload is a computation-intensive workload, otherwise it may be considered the workload is an I/O-intensive workload. It should be understood that any other appropriate means may be used to determine whether the given workload is an I/O-intensive workload is a computation-intensive workload. The scope of the present disclosure is not limited in this regard.

In the embodiment where computing node 220 and storage node 230 each execute part of the computation workload, there may exist two execution modes.

a) Concurrent and Independent Execution Mode

Figure 4A:
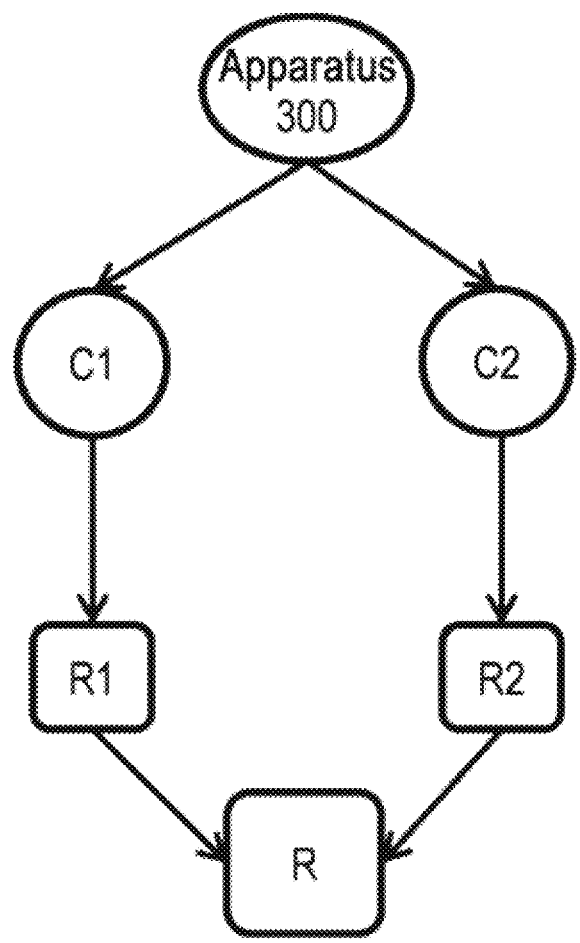
FIG. 4(a) shows a schematic view of concurrent and independent execution mode according to an embodiment of the present disclosure.

FIG. 4(a) shows a schematic view of concurrent and independent execution mode according to an embodiment of the present disclosure. In the embodiment shown in FIG. 4(a), apparatus 300 divides the received computation workload into a first sub-workload and a second sub-workload, which may be executed concurrently and independently by using computing resources C1 in computing node 220 and computing resources C2 in storage node 230. As such, C1 and C2 will independently complete their corresponding computing tasks and produce computing results R1 and R2 respectively. Finally, the computing results R1 and R2 are merged, and the ultimate computing result R is saved into the storage system.

b) Collaborative Execution Mode

Figure 4B:
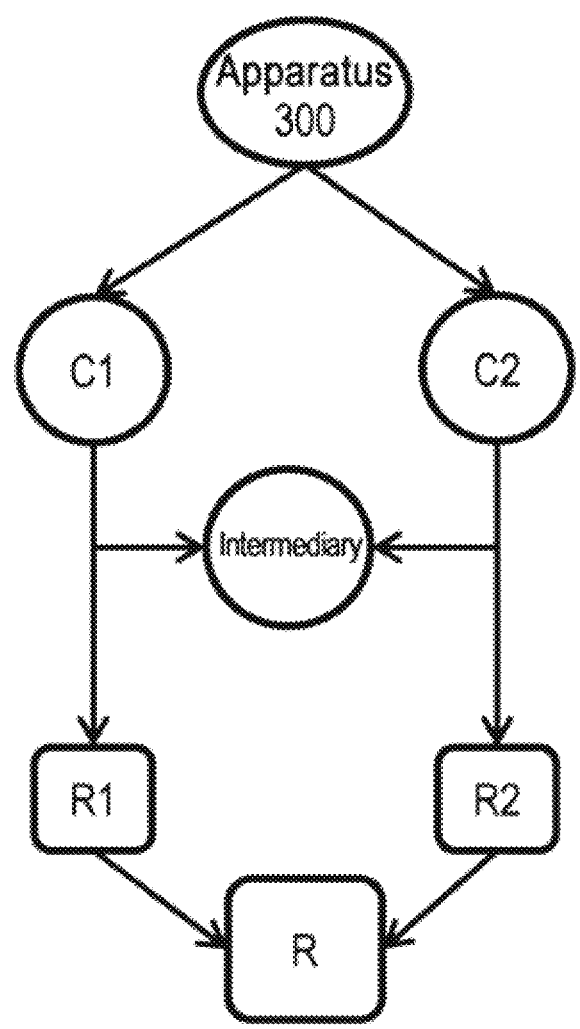
FIG. 4(b) shows a schematic view of collaborative execution mode according to another embodiment of the present disclosure.

FIG. 4(b) shows a schematic view of collaborative execution mode according to another embodiment of the present disclosure. In the embodiment shown in FIG. 4(b), the apparatus 300 divides the received computation workload into a first sub-workload and a second sub-workload, which may be executed by using computing resources C1 in computing node 220 and computing resources in storage node 230. Due to dependency between the first sub-workload and the second sub-workload, e.g. dependency between computing tasks in the first sub-workload and computing tasks in the second sub-workload, there would be data exchange between computing node 220 and storage node 230, for example, via an intermediary shown in FIG. 4(b). Details about the data exchange between computing node 220 and storage node 230 are to be explained below.

In some scenarios, one node has to wait for computing results completed by the other node in order to kick off its own computing tasks. In other scenarios, both nodes can execute computing tasks concurrently, with data exchange taking place during the compute processing. In this embodiment, after the data exchange, C1 and C2 complete their own computing tasks and produce computing results R1 and R2 respectively. Finally, the ultimate computing result R is determined according to the computing results R1 and R2 and then saved into the storage system.

The data exchange between computing node 220 and storage node 230 may be realized via four exemplary methods as below.

a) Direct Data Transferring with Data Transmit Functions Embedded in Computing Logic This method may be used when the amount of data exchange is small. However, the method has potential risks that the computation speed of two nodes cannot keep pace with each other, causing computation blocking and waste of computing resources.

b) Using Storage System as Intermediary

This method may be used when the amount of data exchange is large. The method can effectively resolve the problem of computation speed mismatch, but may lower the computation performance due to potential disk performance bottleneck (I/O bottleneck).

c) Message Queue or in-Memory Non-Relational Database (in-Memory NoSQL) as Intermediary This method may be used when the amount of data exchange is not very large.

d) Combination of any Two of the Above Three Methods

For example, the message queue or in-memory NoSQL may be used as a major intermediary, and the storage system may be used as an auxiliary intermediary. The message queue or in-memory NoSQL guarantees the data transmit performance, while the storage system as the persistence layer maintains data integrity.

Figure 5:
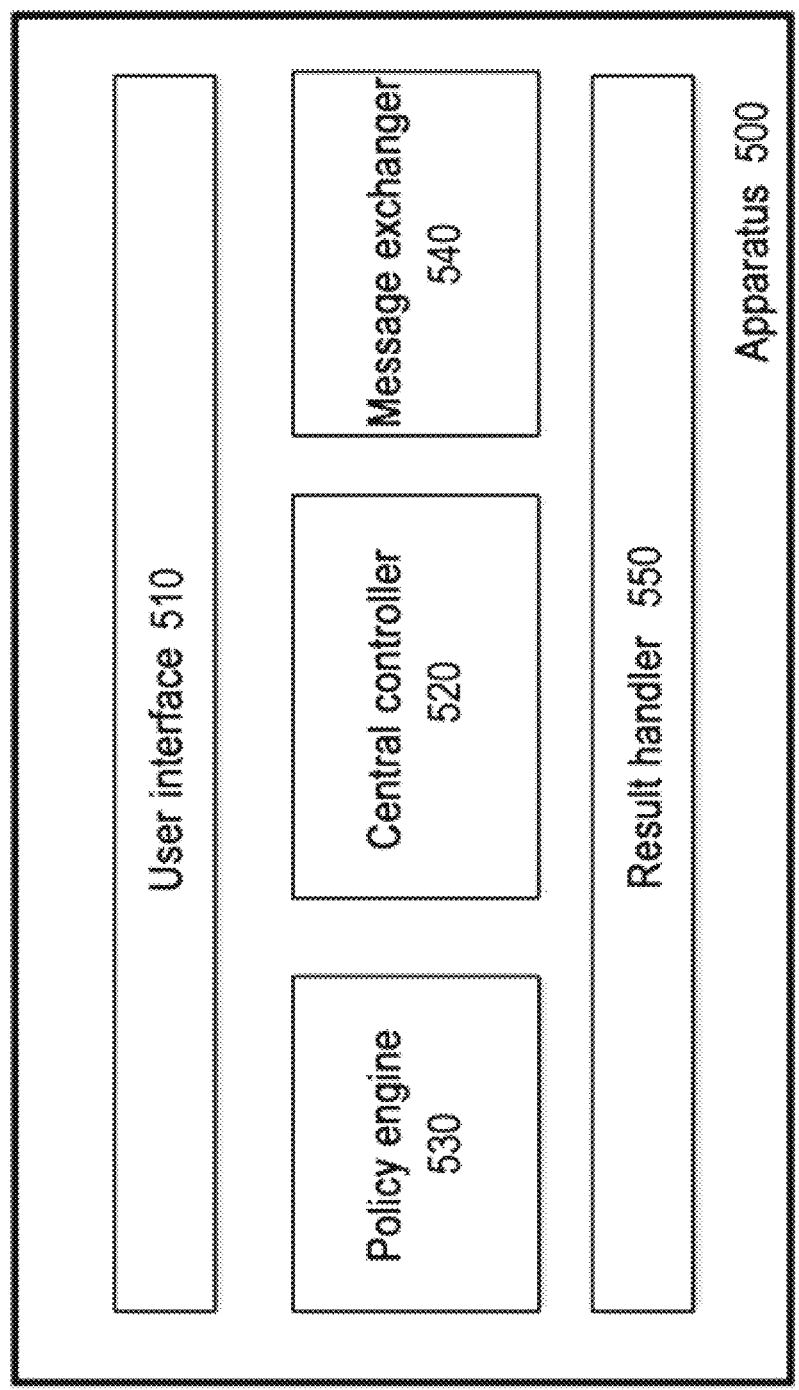
FIG. 5 shows a block diagram of an apparatus for data processing according to another embodiment of the present disclosure.

FIG. 5 shows a block diagram of an apparatus 500 for data processing according to another embodiment of the present disclosure. Apparatus 500 may act as another implementation of apparatus 210 shown in FIG. 2.

As shown in FIG. 5, apparatus 500 comprises a user interface 510, a central controller 520, a policy engine 530, a message exchanger 540 and a result handler 550.

User interface 510 is configured to be the entry point of apparatus 500, receives a computation workload from an application and forwards the received computation workload to central controller 520.

Central controller 520 is configured to be the core of apparatus 500. Central controller 520 is responsible for receiving information from other modules and taking appropriate actions. Also, central controller 520 is configured to control the data exchange between computing node 220 and storage node 230 with the help of message exchanger 540.

Policy engine 530 divides the computation workload into one or more sub-workloads based on a predetermined policy in response to a query from central controller 520. Next, policy engine 530 sends the one or more sub-workloads to central controller 520, and central controller 520 forwards the one or more sub-workloads to message exchanger 540.

Message exchanger 540 is configured to send the one or more sub-workload to computing node 220 and/or storage node 230. Further, message exchanger 540 is configured to be a communication intermediary between the controllers of computing node 220 and storage node 230. Computing node 220 and storage node 230 can independently interact with an underlying storage device, fetching the data for computation and saving the ultimate computing results back to the storage device. In the meantime, the data exchange mode between computing node 220 and storage node 230 may be configured by the user, or by central controller 520 according to the amount of data exchange.

Result handler 550 is configured to fetch respective computing results from computing node 220 and/or storage node 230 and determine the ultimate computing result based on the fetched computing results. For example, result handler 550 may determine the ultimate computing result by merging the computing results fetched from computing node 220 and storage node 230. Result handler 550 is further configured to storage the ultimate computing result to the storage system.

As seen from the foregoing description, central controller 520, policy engine 530 and message exchanger 540 may be configured to perform the functions of dividing unit 310 and dispatching unit 320 in apparatus 300 shown in FIG. 3. In other words, apparatus 500 may act as one exemplary implementation of apparatus 300. Therefore, features of apparatus 300 as described with reference to FIG. 3 above are all applicable to apparatus 500 and thus omitted here.

Figure 6:
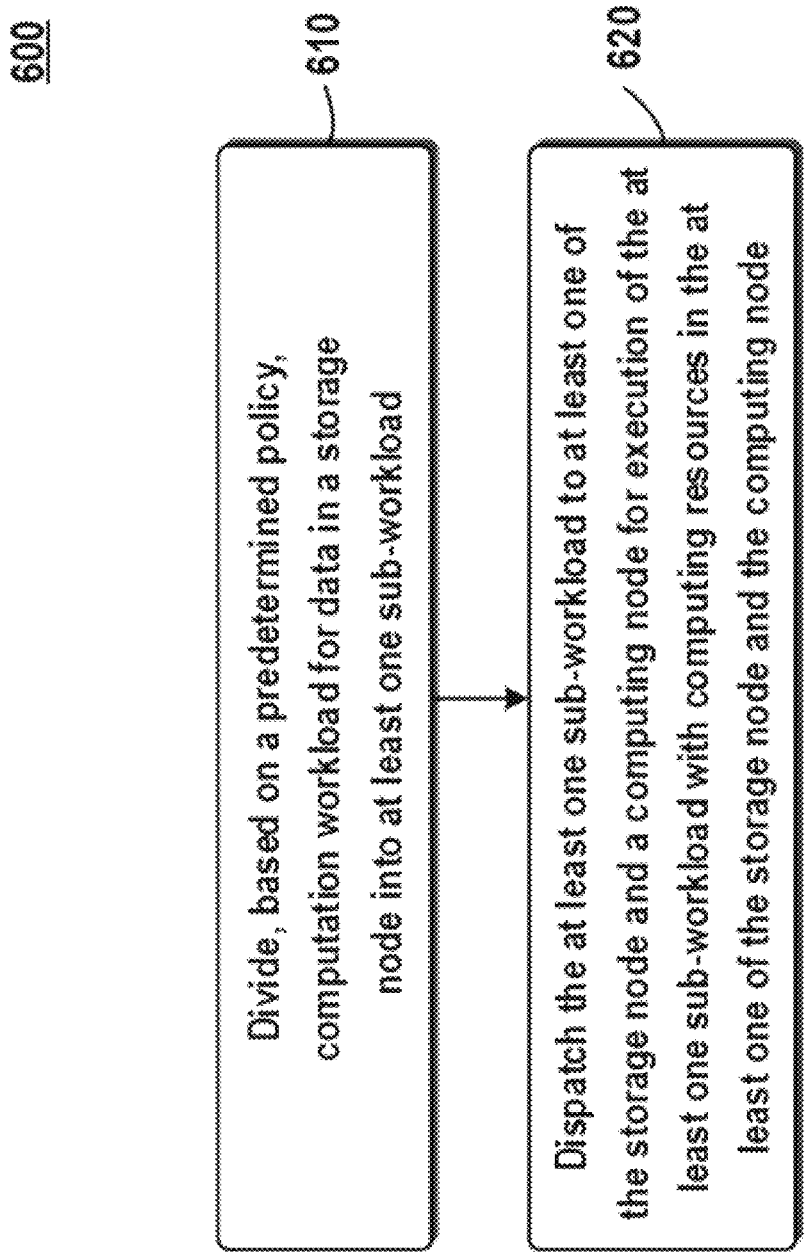
FIG. 6 shows a flowchart of a method for data processing according to an embodiment of the present disclosure.

FIG. 6 shows a flowchart of a method 600 for data processing according to an embodiment of the present disclosure. In some embodiments, method 600 may be executed by apparatus 210 described in conjunction with FIG. 2. Accordingly, with reference to FIG. 2 and by means of exemplary environment 200 shown in FIG. 2, detailed description is presented below to the method for data processing according to the embodiment of the present disclosure.

As shown in FIG. 6, in 610 apparatus 210 divides, based on a predetermined policy, computation workload for data in a storage node 230 into one or more sub-workloads. In 620, apparatus 210 dispatches the one or more sub-workloads to computing node 220 and/or storage node 230 that is physically separate from computing node 220 for execution of the one or more sub-workloads by using computing resources in computing node 220 and/or computing resources in storage node 230.

In some embodiments, the predetermined policy indicates at least one of the following: dividing the computation workload based on computing capability of the computing node 220 and computing capability of the storage node 230; and dividing the computation workload based on a type of the computation workload.

In some embodiment, the one or more sub-workloads at least include a first sub-workload.

In some embodiments, if the predetermined policy indicates dividing the computation workload based on the computing capability of the computing node 220 and the computing capability of the storage node 230, the first sub-workload includes all of the computation workload; and dispatching the one or more sub-workloads to at least one of the storage node 230 and the computing node 220 comprises dispatching the first sub-workload to the storage node 230 in response to determining the computing capability of the storage node 230 is sufficient to execute the first sub-workload.

In some embodiments, if the predetermined policy indicates dividing the computation workload based on the computing capability of the computing node 220 and the computing capability of the storage node 230, the first sub-workload includes part of the computation workload; and dispatching the one or more sub-workloads to at least one of the storage node 230 and the computing node 220 comprises dispatching the first sub-workload to the storage node 230 in response to determining the computing capability of the storage node 230 is sufficient to execute the first sub-workload.

In some embodiments, the one or more sub-workloads further include a second sub-workload that is different than the first sub-workload, the second sub-workload comprising part of the computation workload; and the dividing the one or more sub-workloads to one of the computing node 220 and storage node 230 comprises: dispatching the second sub-workload to computing node 220.

In some embodiments, if the predetermined policy indicates dividing the computation workload based on the computing capability of the computing node 220 and the computing capability of the storage node 230 and dividing the computation workload based on the type of the computation workload, the first sub-workload includes an input/output (I/O)-intensive sub-workload.

In some embodiments, if the predetermined policy indicates dividing the computation workload based on the type of the computation workload, the first sub-workload includes an I/O-intensive sub-workload; and the second sub-workload includes a computing-intensive sub-workload.

In some embodiments, there exists dependency between the first sub-workload and the second sub-workload, and the method further comprises: controlling data exchange between computing node 220 and storage node 230 based on the dependency.

In some embodiments, the method further comprises scheduling execution of the first sub-workload and the second sub-workload based on the dependency.

It should be understood method 600 may be executed by apparatuses 300 and 500 that act as exemplary implementations of apparatus 210. In particular, various steps in method 600 may be executed by corresponding units in apparatuses 300 and 500. Thereby, features described above with reference to apparatuses 300 and 500 are all applicable to the various steps in method 600 and thus omitted here.

Figure 7:
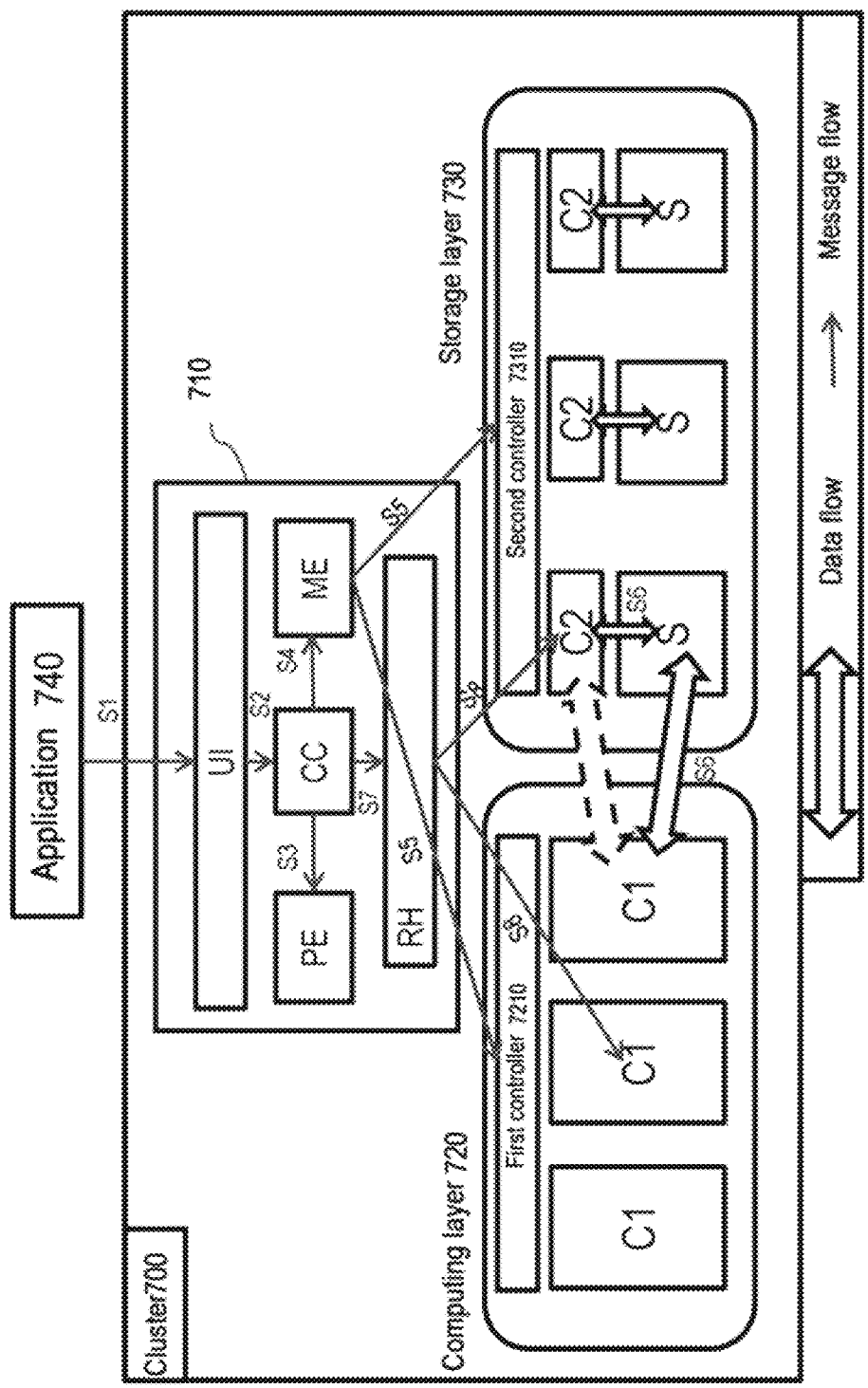
FIG. 7 shows an architecture view of a data processing system according to an embodiments of the present disclosure.

FIG. 7 shows an architecture view of a data processing system 700 according to the embodiments of the present disclosure. Data processing system 700 may be used as one exemplary implementation of environment 200 shown in FIG. 2.

As shown in FIG. 7, data processing system 700 may be implemented as a cluster comprising a plurality of nodes. Cluster 700 comprises an apparatus 710 for data processing according to the embodiments of the present disclosure, a computing layer 720 and a storage layer 730.

Apparatus 710 for data processing comprises a user interface (UI), a central controller (CC), a policy engine (PE), a message exchanger (ME) and a result handler (RH).

The central controller CC, policy engine PE and message exchanger ME may be configured to perform the functions of dividing unit 310 and dispatching unit 320 in apparatus 300 shown in FIG. 3. In other words, like apparatus described with reference to FIG. 5, apparatus 710 may also be used as one exemplary implementation of apparatus 300. Thereby, features of apparatus 300 described with reference to FIG. 3 are all applicable to apparatus 710 and not omitted here.

Apparatus 710 for data processing may be implemented outside computing layer 720 and storage layer 730. Alternatively, apparatus 710 for data processing may also be implemented on one of a plurality of computing nodes in computing layer 720. The scope of the embodiments of the present disclosure is not limited in this regard.

Computing layer 720 comprises a plurality of distributed computing nodes C1, which may communicate with one another via a network. Each computing node C1 may be implemented as a physical or virtual server, for example.

Storage layer 730 is configured to be located outside computing layer 720, that is, is physically separate from computing layer 720. Storage layer 730 may communicate with computing layer 720 via a network.

Storage layer 730 comprises a plurality of distributed storage nodes S, each of which comprises storage resources (not shown) for providing storage services and computing resources C2 for providing data services, such as CPU and a memory. Thereby, the computing resources C2 in storage layer 730 also constitute one computing layer. Compared with computing layer 720, the computing layer constituted by the computing resources C2 is much closer to the storage location. Thus, hereinafter the computing layer constituted by the computing resources C2 is also referred to as a "lower computing layer", while computing layer 720 is referred to as an "upper computing layer". Various computation frameworks like map-reduce, spark, Hadoop and SQL can be deployed in the upper computing layer and the lower computing layer. In addition, since the upper computing layer (i.e., computing layer 720) is the core of providing compute services to users, it is equipped with abundant computing resources. Accordingly, the upper computing layer has stronger compute power than the lower computing layer.

In the meantime, computing layer 720 and storage layer 730 include a first controller 7210 and a second controller 7310 respectively. First controller 7210 is configured to manage and/or control nodes in computing layer 720, while second controller 7310 is configured to manage and/or control nodes in storage layer 730. As one example, first controller 7210 and second controller 7310 may be configured as control nodes in the computation framework, like JobTracker nodes in MapReduce.

It should be understood only for the illustration purpose, FIG. 7 shows computing layer 720 and storage layer 730 each comprise three nodes. In implementation, computing layer 720 and storage layer 730 each may include any appropriate number of nodes. In addition, only for the illustration purpose, FIG. 7 shows each storage node S includes the computing resources C2. In implementation, the number of the computing resources C2 may differ from the number of the storage nodes S, that is, the same computing resources C2 may be shared by the plurality of storage nodes S.

In addition, although the various computing nodes C in computing layer 720 and the storage nodes S in storage layer 730 are shown in the form of a distributed node cluster in FIG. 7, alternatively, computing nodes in computing layer 720 and storage nodes in storage layer 730 may be implemented integrally, or nodes in one of computing layer 720 and storage layer 730 are implemented integrally while nodes in the other one are implemented as a distributed node cluster. The scope of the embodiments of the present disclosure is not limited in this regard.

Detailed description is presented below to the end-to-end lifecycle of a user data computation workload handled by cluster 700 shown in FIG. 7.

In S1, a computation workload from an application 740 is received via the user interface UI.

In S2, the computation workload is forwarded by the user interface UI to the central controller CC.

In S3, the central controller CC inquires the policy engine PE, which then divides the computation workload into two sub-workloads based on a predetermined policy. For example, the received computation workload may be compiled into a directed acyclic graph (DAG). In the DAG each vertex represents a task in the computation workload, while each edge represents data flowing between tasks and dependency between tasks. Tasks in the DAG may comprise, for example, computation-intensive tasks and I/O-intensive tasks. By finding a cut of the DAG the policy engine PE may divide tasks presented in the DAG into computation-intensive tasks and I/O-intensive tasks and send them to the central controller CC. In addition, as the upper computing layer and the lower computing layer may deploy different computation frameworks, the policy engine PE might need to translate the two compute sub-workloads (e.g. computation-intensive tasks and I/O-intensive tasks) into ones executable by the upper computing layer and the lower computing layer.

In S4, the central controller CC forwards the computing sub-workloads to the message exchanger ME.

In S5, the message exchanger ME sends the computing sub-workloads to the upper computing layer and the lower computing layer respectively. Controllers 7210 and 7310 of the upper computing layer and the lower computing layer will receive the computing sub-workloads and kick off the data computation.

In S6, during data computation, there would be data exchange between the upper computing layer/the lower computing layer and the storage system.

When the data computations complete, the upper computing layer and the lower computing layer each send a notification to the message exchanger ME, which will forward the notification to the central controller CC (not shown). Subsequently in S7, the central controller CC asks the result handler RH to handle the final computing results.

In S8, the result handler RH obtains computing results from the upper computing layer and the lower computing layer. For example, the result handler RH saves the results into the storage system by optionally merging the obtained computing results.

As described above, in some cases, there would be data exchange between the upper computing layer and the lower computing layer during the computation process, as shown by dotted arrows in FIG. 7.

As seen from the foregoing description, the embodiments of the present disclosure make use of both the computing capability exposed by storage systems and the external computing servers to construct a two-tier data computing infrastructure. According to the solution of the present disclosure, partial computation workloads are dispatched to the storage system in order to realize the widely adopted idea of "move compute closer to data" for big data analytics and therefore significantly reduce the data traffic between the storage system and the external computing servers. As a result, both the data computation performance and the data service quality of the storage system can be improved.

Figure 8:
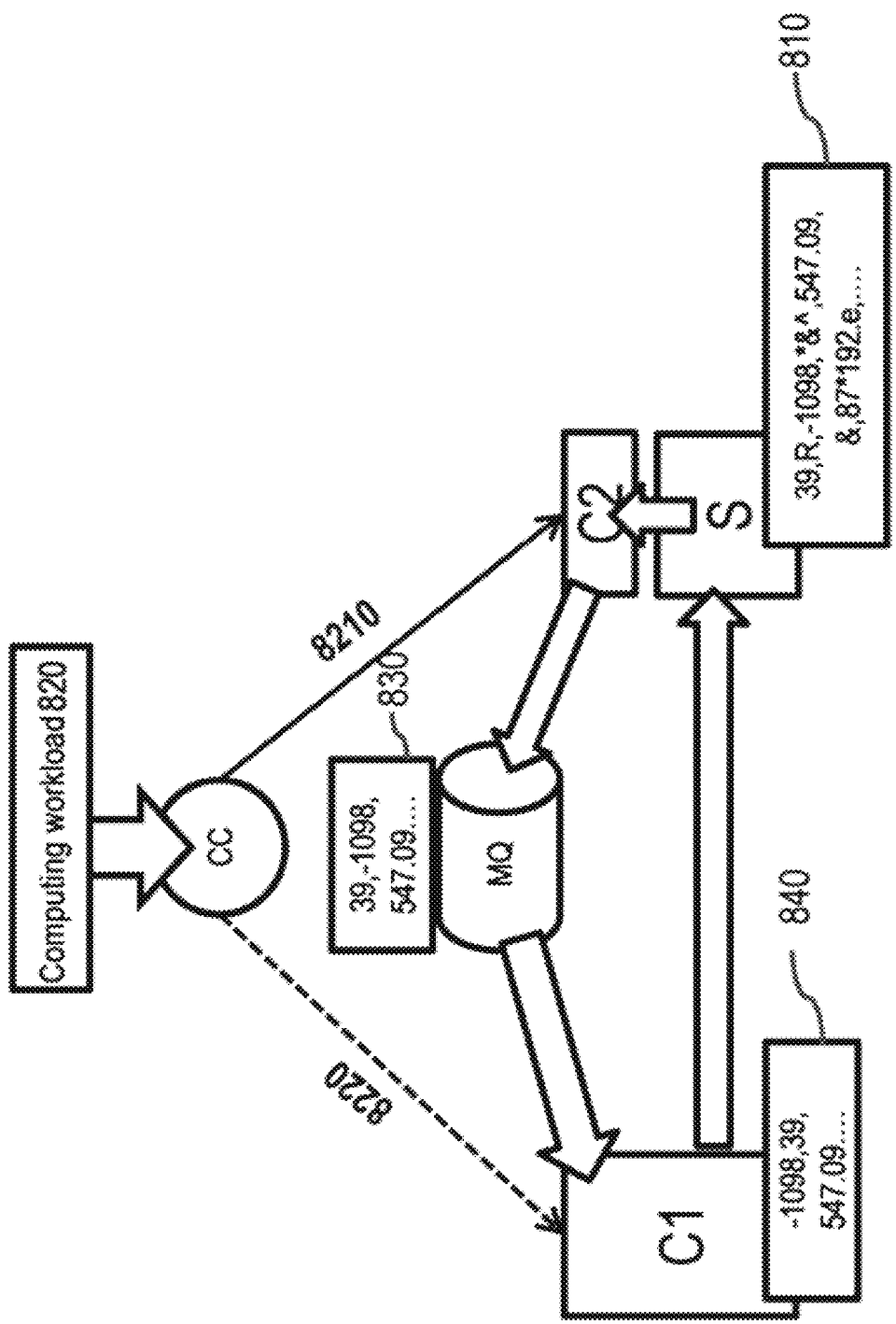
FIG. 8 shows an exemplary application scenario of a method for data processing according to an embodiments of the present disclosure.

FIG. 8 shows an exemplary application scenario of a method for data processing according to the embodiments of the present disclosure. In the scenario shown in FIG. 8, data processing system 700 shown in FIG. 7, for example, is used to perform computation to computation workloads as below: to sort hundreds of millions rows of data. To-be-sorted data 810 is data containing impurities (more than 50%), i.e. containing digital data items and non-digital data items, such as R, *&^, &, * and so on.

Regarding the computation workloads, the overall data computation includes two logical steps. The first step is to filter out all non-digital data items from to-be-sorted data 810 (referred to as "data filtering operation" for short), and the second step is to sort the digital data items (referred to as "data sorting operation" for short).

In a traditional data processing system, all data 810 needs to be retrieved out of the storage system S and fed into the upper computing layer C1 to conduct both steps of data computation.

With the data processing system (e.g. data processing system 700) according to the embodiments of the present disclosure, the central controller CC inquires the policy engine PE (not shown) to divide a received computation workload 820 into a first sub-workload 8210 and a second sub-workload 8220, wherein first sub-workload 8210 comprises data filtering operation while second sub-workload 8220 comprises data sorting operation.

Subsequently, the central controller CC sends first sub-workload 8210 and second sub-workload 8220 via the message exchanger (not shown) to the lower computing layer C2 and the upper computing layer C1 respectively.

The lower computing layer C2 fetches all to-be-sorted data 810 from the storage system S and performs data filtering operation thereon so as to filter non-digital data items, such as R, *&^, &, * and so on. After the data filtering operation, the lower computing layer C2 sends a notification to the central controller CC and sends filtered data 830 to a message queue MQ. In response to receiving the notification from the lower computing layer C2, the central controller CC schedules the upper computing layer C1 to perform data sorting operation. In response to the scheduling, the upper computing layer C1 fetches filtered data 830 from the message queue MQ to perform the data sorting operation. After the data sorting operation, ultimate computing results 840 are obtained.

In the foregoing process, since the portion of digital data items is less than 50%, more than 50% data traffic between the storage system S and the upper computing layer C1 can be saved.

Figure 9:
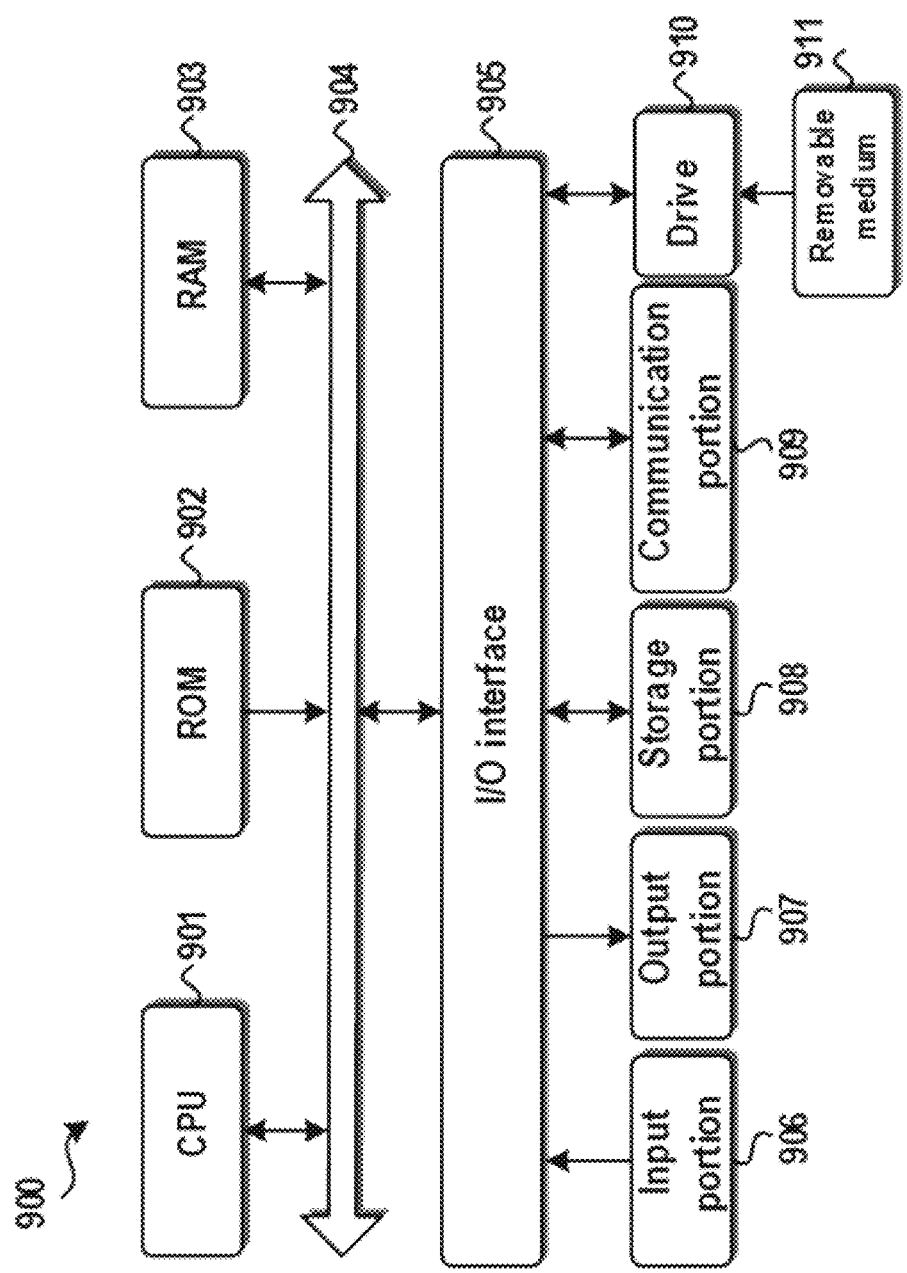
FIG. 9 shows a schematic block diagram of an exemplary computer system which is applicable to implement the embodiments of the present disclosure.

FIG. 9 shows a schematic block diagram of a computer system suitable for implementing the embodiments of the present disclosure.

With reference to FIG. 9 below, there is shown a schematic block diagram of an example computer system 900 suitable for implementing the embodiments of the present disclosure. As shown, computer system 900 comprises a central processing unit (CPU) 901 which is capable of performing various processes in accordance with a program stored in a read only memory (ROM) 902 or a program loaded from a storage portion 908 to a random access memory (RAM) 903. In RAM 903, data required when CPU 901 performs the various processes or the like is also stored as required. CPU 901, ROM 902 and RAM 903 are connected to one another via a bus 904. An input/output (I/O) interface 905 is also connected to bus 904.

The following components are connected to I/O interface 905: an input portion 906 including a keyboard, a mouse, or the like; an output portion 907 including a display such as a cathode ray tube (CRT), a liquid crystal display (LCD), or the like, and a loudspeaker or the like; storage portion 908 including a hard disk or the like; and a communication portion 909 including a network interface card such as a LAN card, a modem, or the like. Communication portion 909 performs a communication process via the network such as the internet. A drive 910 is also connected to I/O interface 905 as required. A removable medium 911, such as a magnetic disk, an optical disk, a magneto-optical disk, a semiconductor memory, or the like, is mounted on drive 910 as required, so that a computer program read therefrom is installed into storage portion 908 as required.

Specifically, in accordance with example embodiments of the present disclosure, the processes described with reference to FIG. 6 above may be implemented as computer software programs. For example, embodiments of the present disclosure comprise a computer program product including a computer program tangibly embodied on a machine readable medium, the computer program including program code for performing method 600.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product comprising a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any disclosure or of what may be claimed, but rather as descriptions of features that may be specific to particular embodiments of particular disclosures. Certain features that are described in this specification in the context of separate embodiments may also be implemented in combination in a single embodiment. Conversely, various features that are described in the context of a single embodiment may also be implemented in multiple embodiments separately or in any suitable sub-combination.

Various modifications, adaptations to the foregoing example embodiments of this disclosure may become apparent to those skilled in the relevant arts in view of the foregoing description, when read in conjunction with the accompanying drawings. Any and all modifications will still fall within the scope of the non-limiting and example embodiments of this disclosure. Furthermore, other embodiments of the disclosures set forth herein will come to mind to one skilled in the art to which these embodiments of the disclosure pertain having the benefit of the teachings presented in the foregoing descriptions and the drawings.

It will be appreciated that the embodiments of the present disclosure are not to be limited to the specific embodiments as discussed above and that modifications and other embodiments are intended to be included within the scope of the appended claims. Although specific terms are used herein, they are used in a generic and descriptive sense only and not for purposes of limitation.

We claim:

1. An apparatus for data processing, comprising:
a dividing unit configured to divide, based on a predetermined policy, computation workload for data in a storage device in a storage node into at least one sub-workload for execution by one or more of the storage node and a computing node; and
a dispatching unit configured to dispatch at least a portion of the at least one sub-workload from the storage device to the storage node for execution of the at least one sub-workload with computing resources in the storage node, the storage node being an external storage system, and the computing node being physically separate from the storage node, wherein dispatching the at least a portion of the at least one sub-workload from the storage device to the storage node for execution includes moving the at least a portion of the at least one sub-workload from the storage device to the computing resources in the storage node and wherein dispatching the at least a portion of the at least one sub-workload from the storage device to the computing node for execution includes transmitting the at least a portion of the at least one sub-workload from the storage device to the computing node via a network when additional computing capability beyond a computing capability of the storage node is needed to execute the at least a portion of the at least one sub-workload, wherein the computing capability of the storage node is determined by estimating an amount of required computing resources for executing all or part of the at least one sub-workload, wherein estimating the amount of required computing resources includes determining whether an amount of remaining computing resources is greater than the amount of required computing resources after computing resources used for providing data services from the computing resources of the storage node are removed.

2. The apparatus according to claim 1, wherein the predetermined policy indicates at least one of the following:
dividing the computation workload based on respective computing capabilities of the computing node and the storage node; and
dividing the computation workload based on a type of the computation workload.

3. The apparatus according to claim 2, wherein the at least one sub-workload at least include a first sub-workload.

4. The apparatus according to claim 3, wherein the dividing unit is configured to divide all of the computation workload into the first sub-workload if the predetermined policy indicates dividing the computation workload based on the respective computing capabilities of the computing node and the storage node; and
wherein the dispatching unit is further configured to dispatch the first sub-workload to the storage node in response to determining that the computing capability of the storage node is sufficient to execute the first sub-workload.

5. The apparatus according to claim 3, wherein the dividing unit is configured to divide a part of the computation workload into the first sub-workload if the predetermined policy indicates dividing the computation workload based on the respective computing capabilities of the computing node and the storage node; and
wherein the dispatching unit is further configured to dispatch the first sub-workload to the storage node in response to determining that the computing capability of the storage node is sufficient to execute the first sub-workload.

6. The apparatus according to claim 5, wherein the at least one sub-workload further includes a second sub-workload that is different from the first sub-workload, the second sub-workload including a part of the computation workload; and
wherein the dispatching unit is further configured to dispatch the second sub-workload to the computing node.

7. The apparatus according to claim 4, wherein the dividing unit is configured to divide the computation workload into an input/output (I/O)-intensive sub-workload if the predetermined policy indicates dividing the computation workload based on the respective computing capabilities of the computing node and the storage node and based on the type of the computation workload; and
wherein the dispatching unit is configured to dispatch the I/O-intensive sub-workload to the storage node.

8. The apparatus according to claim 6, wherein if the predetermined policy indicates dividing the computation workload based on the type of the computation workload, the first sub-workload includes an input/output I/O-intensive sub-workload; and the second sub-workload includes a computing-intensive sub-workload.

9. The apparatus according to claim 6, wherein there is dependency between the first and second sub-workloads, the apparatus further comprising:
a control unit configured to control data exchange between the computing node and the storage node based on the dependency.

10. The apparatus according to claim 9, wherein the control unit is further configured to:
schedule execution of the first and second sub-workloads based on the dependency.

11. A method for data processing, comprising:
dividing, based on a predetermined policy, computation workload for data in a storage device in a storage node into at least one sub-workload for execution by one or more of the storage node and a computing node; and
dispatching at least a portion of the at least one sub-workload to the storage node for execution of the at least one sub-workload from the storage device with computing resources in the storage node, the storage node being an external storage system, and the computing node being physically separate from the storage node, wherein dispatching the at least a portion of the at least one sub-workload from the storage device to the storage node for execution includes moving the at least a portion of the at least one sub-workload from the storage device to the computing resources in the storage node and wherein dispatching the at least a portion of the at least one sub-workload from the storage device to the computing node for execution includes transmitting the at least a portion of the at least one sub-workload from the storage device to the computing node via a network if additional computing capability beyond a computing capability of the storage node is needed to execute the at least a portion of the at least one sub-workload wherein the computing capability of the storage node is determined by estimating an amount of required computing resources for executing all or part of the at least one sub-workload, wherein estimating the amount of required computing resources includes determining whether an amount of remaining computing resources is greater than the amount of required computing resources after computing resources used for providing data services from the computing resources of the storage node are removed.

12. The method according to claim 11, wherein the predetermined policy indicates at least one of the following:
dividing the computation workload based on respective computing capabilities of the computing node and the storage node; and
dividing the computation workload based on a type of the computation workload.

13. The method according to claim 12, wherein the at least one sub-workload at least include a first sub-workload.

14. The method according to claim 13, wherein dividing the computation workload into the at least one sub-workload comprises dividing all of the computation workload into the first sub-workload if the predetermined policy indicates dividing the computation workload based on the respective computing capabilities of the computing node and the storage node, and
wherein dispatching the at least one sub-workload to at least one of the storage node and the computing node comprises dispatching the first sub-workload to the storage node in response to determining that the computing capability of the storage node is sufficient to execute the first sub-workload.

15. The method according to claim 13, wherein dividing the computation workload into the at least one sub-workload comprises dividing a part of the computation workload into the first sub-workload if the predetermined policy indicates dividing the computation workload based on the respective computing capabilities of the computing node and the storage node; and
wherein dispatching the at least one sub-workload to at least one of the storage node and the computing node comprises dispatching the first sub-workload to the storage node in response to determining that the computing capability of the storage node is sufficient to execute the first sub-workload.

16. The method according to claim 15, wherein the at least one sub-workload further includes a second sub-workload that is different from the first sub-workload, the second sub-workload including a part of the computation workload; and wherein dispatching the at least one sub-workload to at least one of the storage node and the computing node comprises dispatching the second sub-workload to the computing node.

17. The method according to claim 14, wherein dividing the computation workload into the at least one sub-workload comprises dividing the computation workload into an input/output (I/O)-intensive sub-workload if the predetermined policy indicates dividing the computation workload based on the respective computing capabilities of the computing node and the computing capability of the storage node and based on the type of the computation workload; and wherein dispatching the at least one sub-workload to at least one of the storage node and the computing node comprises dispatching the I/O-intensive sub-workload to the storage node.

18. The method according to claim 16, wherein if the predetermined policy indicates dividing the computation workload based on the type of the computation workload, the first sub-workload includes an input/output (I/O)-intensive sub-workload, and the second sub-workload includes a computing-intensive sub-workload.

19. The method according to claim 16, wherein there is dependency between the first and second sub-workloads, the method further comprising:

controlling data exchange between the computing node and the storage node based on the dependency.

20. The method according to claim 19, further comprising:

scheduling execution of the first and second sub-workloads based on the dependency.

\* \* \* \* \*